United States Patent
Oishi et al.

(10) Patent No.: US 8,096,908 B2
(45) Date of Patent: Jan. 17, 2012

(54) BICYCLE SPROCKET WITH A LATERALLY PROJECTING GEAR CHANGE TOOTH

(75) Inventors: Toshinari Oishi, Sakai (JP); Kenji Kamada, Osaka (JP); Shingo Numata, Sakai (JP)

(73) Assignee: Shimano, Inc., Sakai-ku, Sakai (JP)

( * ) Notice: Subject to any disclaimer, the term of this patent is extended or adjusted under 35 U.S.C. 154(b) by 2237 days.

(21) Appl. No.: 10/905,075

(22) Filed: Dec. 14, 2004

(65) Prior Publication Data

US 2006/0128511 A1  Jun. 15, 2006

(51) Int. Cl.
*B62M 9/10* (2006.01)
(52) U.S. Cl. .......................... 474/160; 474/164
(58) Field of Classification Search .............. 474/152, 474/160, 164
See application file for complete search history.

(56) References Cited

U.S. PATENT DOCUMENTS

| | | | |
|---|---|---|---|
| 4,519,791 A * | 5/1985 | Nagano | 474/152 |
| 4,773,893 A | 9/1988 | Su et al. | |
| 4,889,521 A * | 12/1989 | Nagano | 474/164 |
| 5,073,151 A | 12/1991 | Nagano | |
| 5,162,022 A | 11/1992 | Kobayashi | |
| 5,188,569 A | 2/1993 | Kobayashi | |
| 5,503,598 A | 4/1996 | Neuer et al. | |
| 5,514,042 A | 5/1996 | Liou | |
| 5,545,096 A | 8/1996 | Su | |
| 5,569,107 A | 10/1996 | Mu | |
| 5,716,297 A | 2/1998 | Bodmer | |
| 5,733,215 A | 3/1998 | Hsu et al. | |
| 5,782,712 A | 7/1998 | Campagnolo | |
| 5,876,159 A | 3/1999 | Tseng et al. | |
| 5,876,296 A | 3/1999 | Hsu et al. | |
| 5,935,033 A | 8/1999 | Tseng et al. | |
| 6,013,001 A | 1/2000 | Miyoshi | |
| 6,045,472 A | 4/2000 | Sung et al. | |
| D424,983 S | 5/2000 | Liang | |
| 6,102,821 A | 8/2000 | Nakamura | |
| 6,139,456 A | 10/2000 | Lii et al. | |
| 6,340,338 B1 | 1/2002 | Kamada | |
| 2003/0073530 A1 | 4/2003 | Mao et al. | |
| 2004/0043855 A1 | 3/2004 | Wei | |

FOREIGN PATENT DOCUMENTS

| | | |
|---|---|---|
| FR | 2545902 A1 | 11/1984 |
| JP | 53-114754 U | 2/1977 |

OTHER PUBLICATIONS

Recon Bike Components Co., Ltd. sprocket advertisement, published prior to the filed of this application.
European Search Report for EP 05027415, the European equivalent of this application, dated Jan. 11, 2007.

* cited by examiner

*Primary Examiner* — Richard W Ridley
*Assistant Examiner* — Terence Boes
(74) *Attorney, Agent, or Firm* — James A. Deland

(57) ABSTRACT

A sprocket comprises a sprocket body and a plurality of sprocket teeth extending radially outwardly from a root portion of the sprocket body. The sprocket body has a first side surface and a second side surface, wherein a root portion side surface of the root portion defines a root portion plane at the first side surface of the sprocket body. A shift assist recess is formed in the root portion below a first sprocket tooth at the first side surface of the sprocket body, and a second sprocket tooth has a projecting portion that extends laterally outwardly from the root portion plane at the first side surface of the sprocket body.

16 Claims, 5 Drawing Sheets

BICYCLE SPROCKET WITH A LATERALLY PROJECTING GEAR CHANGE TOOTH

BACKGROUND OF THE INVENTION

The present invention is directed to bicycles and, more particularly, to a multistage sprocket assembly for a bicycle, wherein the multistage sprocket assembly comprises at least one larger diameter sprocket and at least one smaller diameter sprocket that are mounted on a rear hub of the bicycle so as to shift a driving chain for changing the bicycle speed.

U.S. Pat. No. 4,889,521 discloses a multistage sprocket assembly that includes at least one larger diameter sprocket and at least one smaller diameter sprocket assembled in a relationship such that the center point between a pair of adjacent teeth at the larger diameter sprocket and the center point between a pair of adjacent teeth at the smaller diameter sprocket are positioned on a tangent extending along the chain path when the chain is being shifted from the smaller diameter sprocket to the larger diameter sprocket. The distance between the center points is substantially equal to an integer multiple of the chain pitch. A chain guide portion is provided at the inside surface of the larger diameter sprocket at a position corresponding to the path of the chain when the chain travels between the center points for allowing the chain to move axially of the sprocket assembly slightly toward the larger diameter sprocket. This facilitates shifting the chain from the smaller diameter sprocket to the larger diameter sprocket. One or more teeth on the larger diameter sprocket may be offset or inclined from a centerline of the sprocket body to further facilitate shifting the chain from the smaller diameter sprocket to the larger diameter sprocket.

SUMMARY OF THE INVENTION

The present invention is directed to various features of a rear sprocket for a bicycle. In one embodiment, a rear sprocket comprises a sprocket body and a plurality of sprocket teeth extending radially outwardly from a root portion of the sprocket body. The sprocket body has a first side surface and a second side surface, wherein a root portion side surface of the root portion defines a root portion plane at the first side surface of the sprocket body. A shift assist recess is formed in the root portion below a first sprocket tooth at the first side surface of the sprocket body, and a second sprocket tooth has a projecting portion that extends laterally outwardly from the root portion plane at the first side surface of the sprocket body. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
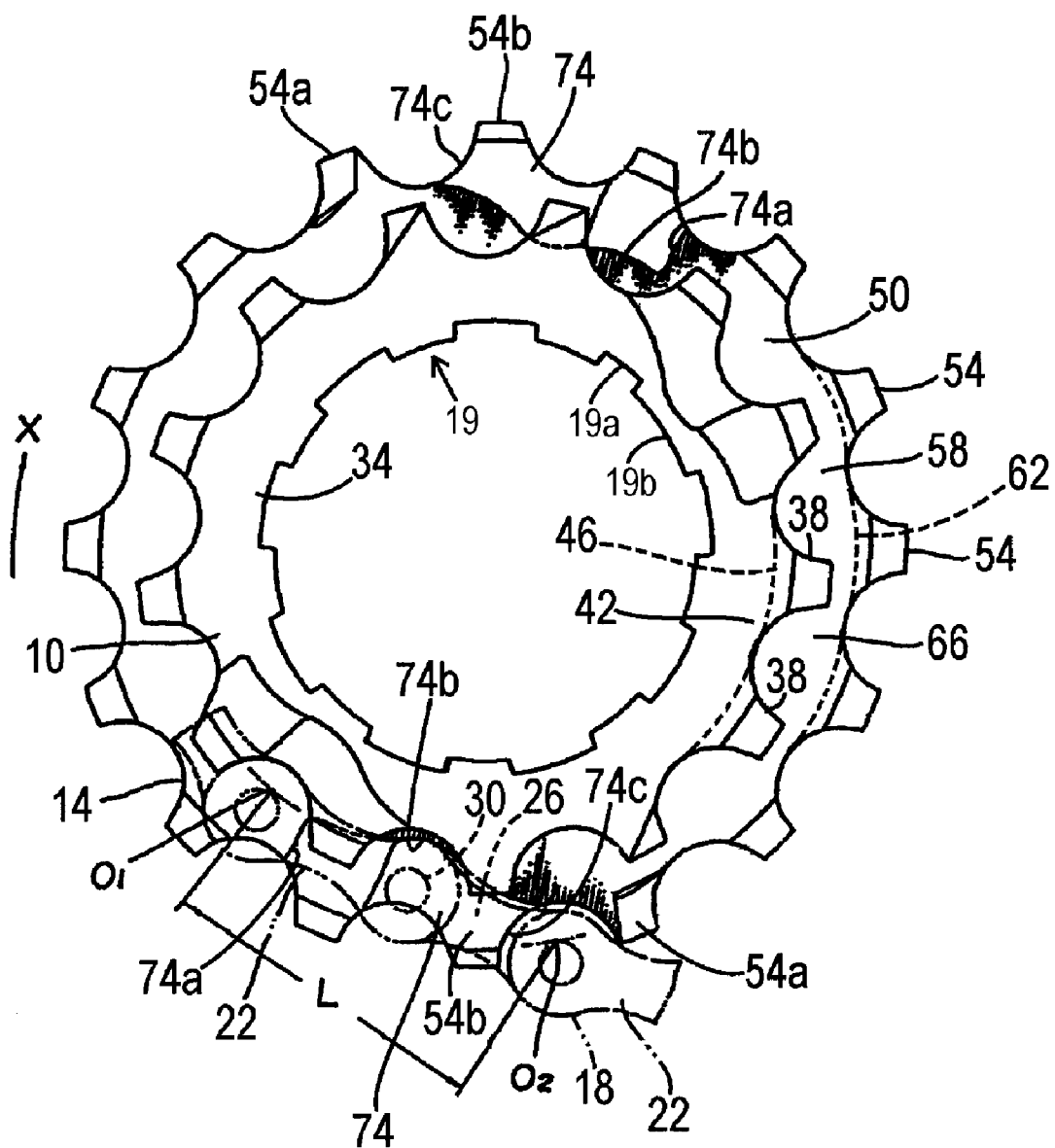
FIG. 1 is a side view of a particular embodiment of first and second sprockets.

FIG. 1 is a side view of a particular embodiment of a smaller diameter first sprocket 10 and a larger diameter second sprocket 14. Sprockets 10 and typically form part of a multiple sprocket cluster wherein a plurality of, e.g., two through nine sprockets are coaxially mounted together and axially spaced apart from each other by a predetermined distance for rotation around a common axis such as a rear wheel hub axle. When mounted for rotation around a wheel hub axle, sprockets 10 and 14 typically are mounted around a tubular sprocket-mounting sleeve (not shown) though a plurality of splines 19 that engage a corresponding plurality of splines on the sprocket mounting sleeve in a known manner. A radially outwardly extending spline 19a and a radially inwardly extending spline 19b on each sprocket usually has a different shape from the remaining splines 19 to fix each of the plurality of sprockets at a predetermined rotational position relative to its adjacent sprocket(s). The sprocket mounting sleeve is, in turn, rotatably mounted around the hub axle through a plurality of ball bearings and a one-way clutch in a known manner.

Small diameter sprocket 10 comprises a sprocket body 34 and a plurality of sprocket teeth 38 extending radially outwardly from a root portion 42 of sprocket body 34. Root portion 42 extends radially inwardly from a root circle 46 of sprocket body 34. As is well known, a root circle is a hypothetical circle defined by the bottom of the tooth spaces of a sprocket.

Figure 2A:
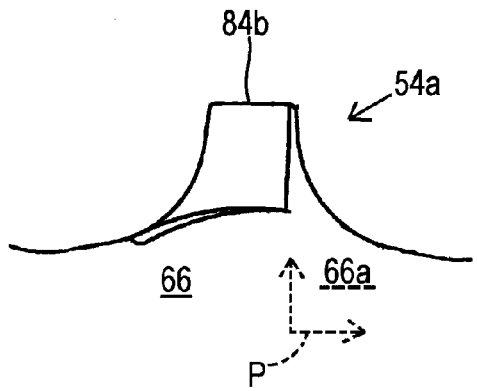
FIG. 2A is a front view of a particular embodiment of a shift assist tooth.
Figure 2B:
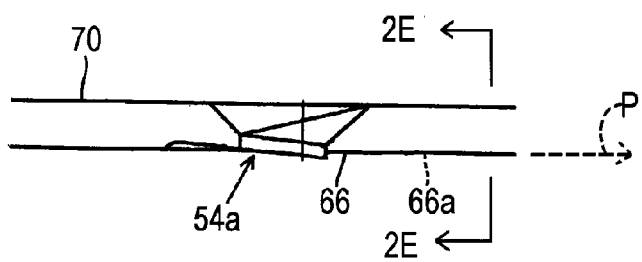
FIG. 2B is a top view of the shift assist tooth.

Similarly, larger diameter sprocket 14 comprises a sprocket body 50 and a plurality of sprocket teeth 54 extending radially outwardly from a root portion 58 of sprocket body 50. Root portion 58 extends radially inwardly from a root circle 62 of sprocket body 50. In this embodiment, sprocket body 50 has a first side surface 66 and a second side surface 70 (FIG. 2B), wherein a root portion side surface 66a (FIGS. 2B and 2C) of first side surface 66 at root portion 58 defines a root portion plane P.

Sprockets 10 and 14 are assembled in a relationship such that a center point O1 between a pair of adjacent teeth 38 of smaller diameter sprocket 10 and a center point O2 between a pair of adjacent teeth 54 of larger diameter sprocket 14 are positioned on a tangent which, as shown by the chain line in FIG. 1, extends along a path of a driving chain 18 when chain 18 is being shifted from smaller diameter sprocket 10 to larger diameter sprocket 14. Chain 18 has a typical construction wherein pairs of outer link plates 22 alternate with pairs of inner link plates 26, and each pair of link plates is connected to the adjacent pair of link plates through a connecting pin 30. Preferably, a distance L between centers O1 and O2 is substantially equal to an integer multiple of the chain pitch (distance between connecting pins 30) of chain 18.

Figure 3:
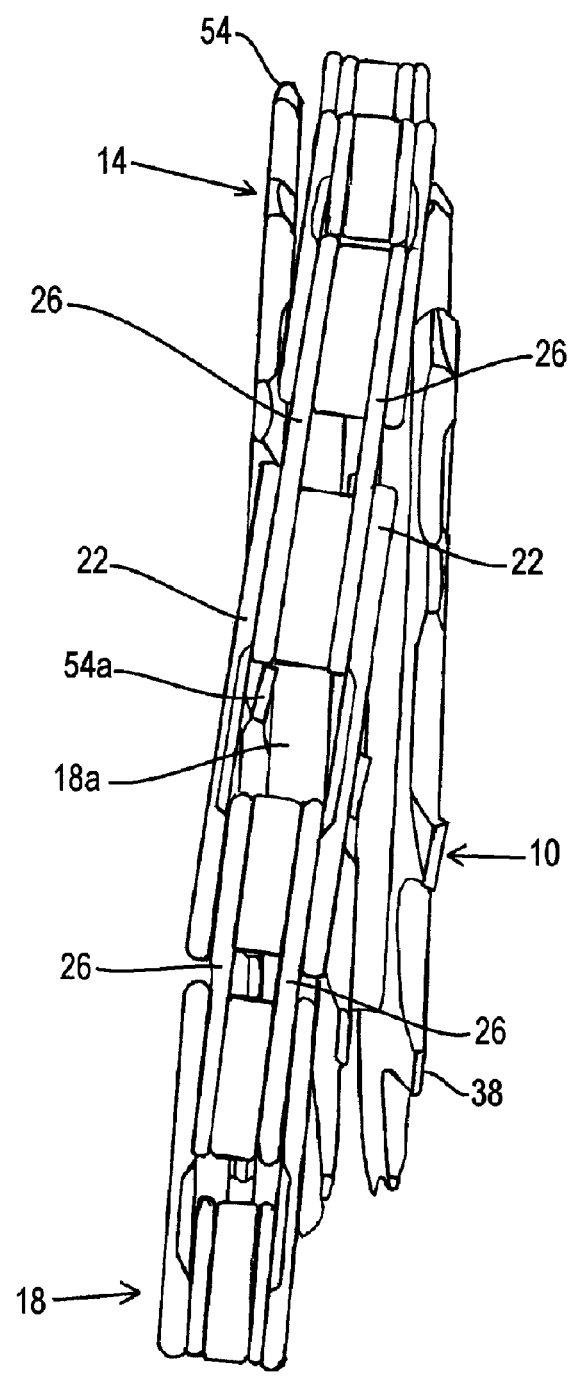
FIG. 3 is a top view illustrating shifting of a bicycle chain from the first sprocket to the second sprocket when the shift assist tooth is aligned with an outer link plate of a bicycle chain.
Figure 4:
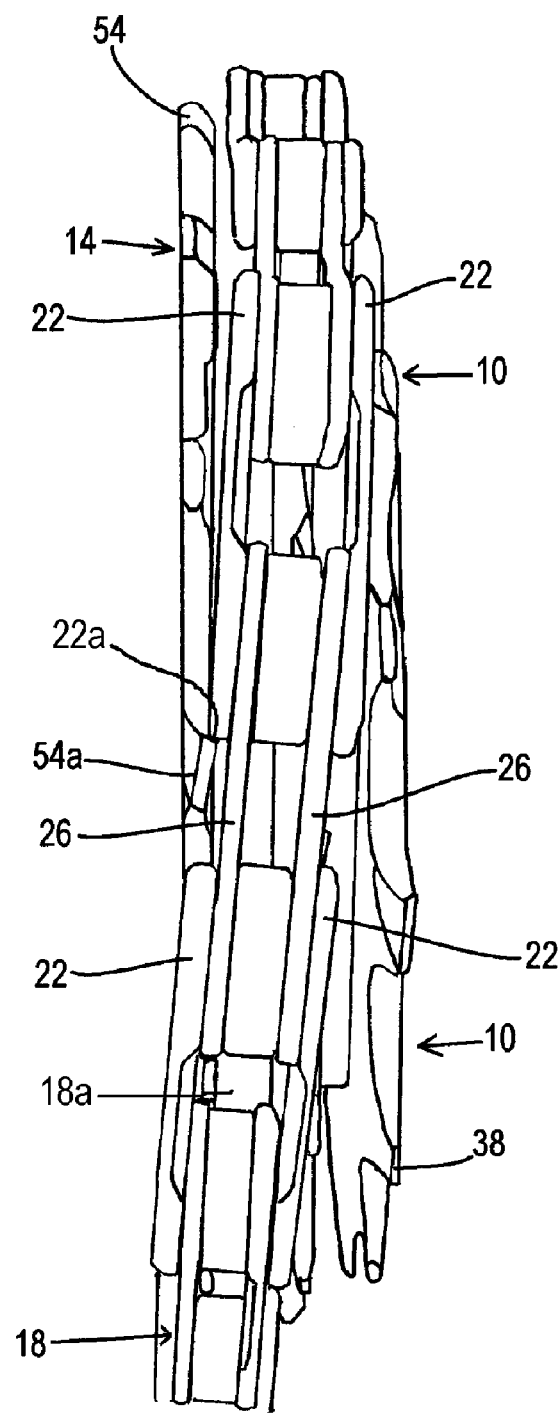
FIG. 4 is a top view illustrating shifting of a bicycle chain from the first sprocket to the second sprocket when the shift assist tooth is aligned with an inner link plate of the bicycle chain.
Figure 5:
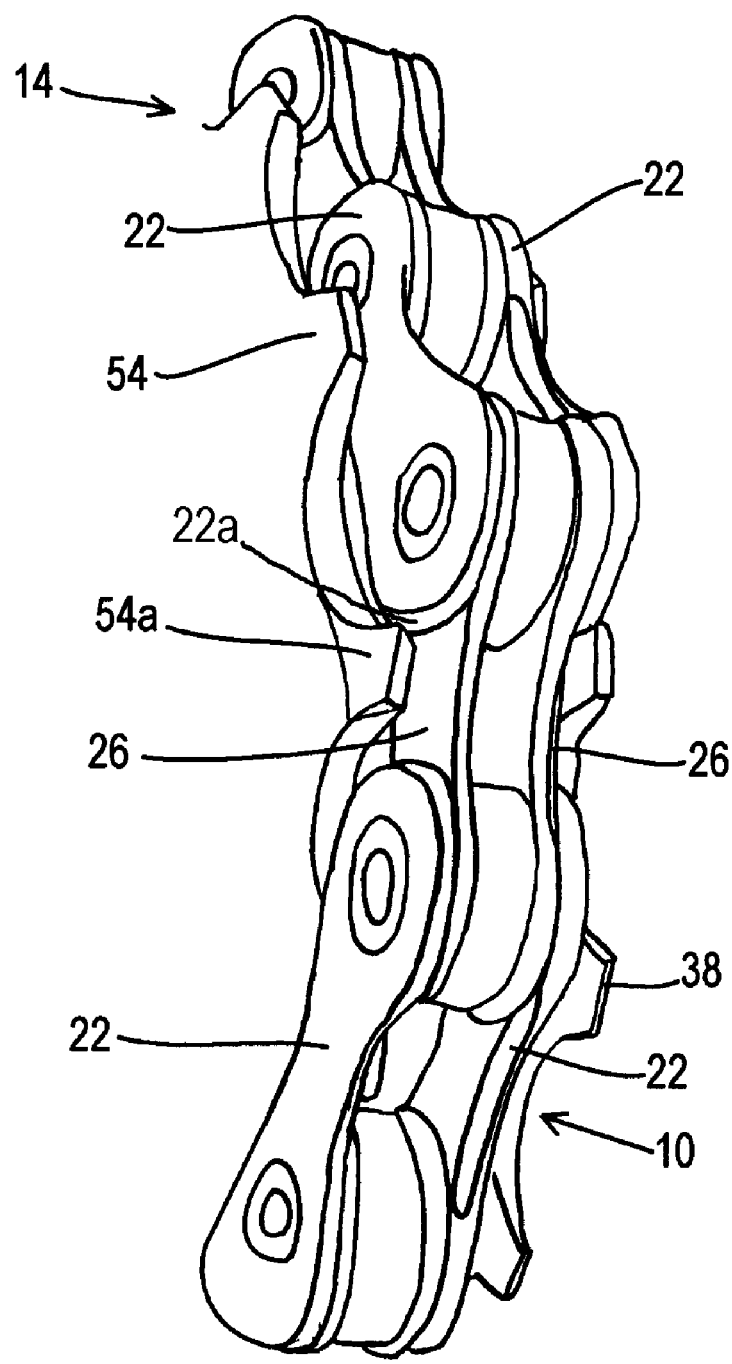
FIG. 5 is an oblique view illustrating shifting of a bicycle chain from the first sprocket to the second sprocket when the shift assist tooth is aligned with the inner link plate of the bicycle chain.

A shift assist recess 74 allowing chain 18 to deviate toward larger diameter sprocket 14 is recessed at first side surface 66 of sprocket body 50 at a position corresponding to a traveling path of chain 18 when chain travels between centers O1 and O2. Shift assist recess 74 is recessed preferably deep enough to prevent inner link plate 26 of chain 18 from riding on at least one shift assist tooth 54a of larger diameter sprocket 14 (two such teeth 54a are shown in FIG. 1), each shift assist tooth 54a being positioned behind each center O2 of larger diameter sprocket 14 relative to a driving rotation direction X of sprockets 10 and 14. Shift assist recess 74 also is large enough to receive the link plates of chain 18 facing larger diameter sprocket 14 therein. As a result, chain 18 can deviate a predetermined amount toward second surface 70 of larger diameter sprocket 14 so that shift assist tooth 54a engages a space 18a (FIG. 3) between outer link plates 22 when outer link plates 22 align with shift assist tooth 54a. Also, inner link plates 26 of chain 18 are prevented from riding on shift assist tooth 54a when inner link plates 26 align with shift assist tooth 54a as shown in FIGS. 4 and 5. This allows the following tooth 54 behind shift assist tooth 54a in the driving rotation direction X to engage the space 18a in the next pair of outer link plates 22.

In this embodiment, shift assist recess 74 is formed from an initial end edge 74a somewhat spaced apart from center O1, wherein initial end edge 74a is positioned between the two adjacent teeth 38 that define center O1 at smaller diameter sprocket 10 and is positioned between center O1 and center O2. Initial end edge 74a extends radially inwardly to a bottom edge 74b. Bottom edge 74b extends to a termination 74c, wherein termination 74c extends into approximately the bottom of the space between shift assist tooth 54a and a tooth 54b positioned ahead of shift assist tooth 54a in the rotation direction X. Shift assist recess 74 may be laterally inclined to further assist the shifting of chain 18 from smaller diameter sprocket 10 to larger diameter sprocket 14. Laterally thinner teeth spanned by shift assist recess 74 may be increased in circumferential width to increase the strength of those teeth.

Each shift assist tooth 54a is configured to assist the shifting of chain 18 from smaller diameter sprocket 10 to larger diameter sprocket 14. The other teeth 54 are configured to be neutral with respect to the shifting of chain 18 from smaller diameter sprocket 10 to larger diameter sprocket 14, or even formed so as to discourage the shifting of chain 18 from smaller diameter sprocket 10 to larger diameter sprocket 14 in a known manner.

Figure 2C:
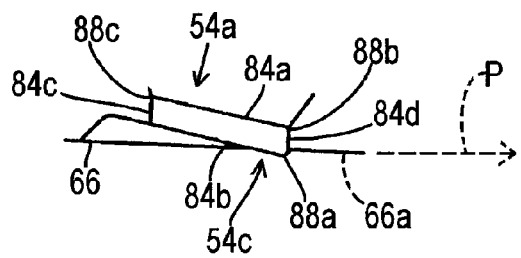
FIG. 2C is a more detailed top view of the shift assist tooth.
Figure 2D:
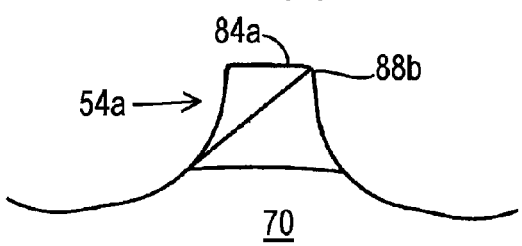
FIG. 2D is a rear view of the shift assist tooth.
Figure 2E:
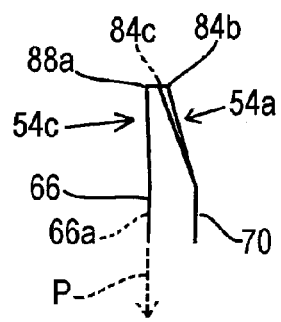
FIG. 2E is a view taken along line 2E-2E in FIG. 2B.

As shown in FIG. 2C, in this embodiment shift assist tooth 54a includes top edges 84a, 84b, 84c and 84d that form the shape of a parallelogram. More specifically, top edges 84a and 84b are substantially straight and substantially parallel to each other and are inclined relative to root portion plane P, and top edges 84c and 84d are substantially straight and substantially parallel to each other and are oriented substantially perpendicular to root portion plane P. Shift assist tooth 54a also includes a projecting portion 54c that extends to a corner 88a formed between top edges 84b and 84d. Projecting portion 54c extends laterally outwardly from root portion plane P at first side surface 66.

One advantage of projecting portion 54c is that a portion of top edge 84d in proximity to corner 88a forms an abutment for contacting a forward edge 22a of outer link plate 22 of chain 18 when inner link plates 26 align with shift assist tooth 54a as shown in FIGS. 4 and 5. This helps to ensure proper pitch alignment of chain 18 with teeth 54 of larger diameter sprocket 14 so that the following pair of outer link plates 22 reliably engage the tooth 54 following shift assist tooth 54a.

In this embodiment, corner 88a extends approximately 0.2 mm from root portion plane P when sprocket body 66 has a thickness of approximately 1.6 mm. Of course, the amount of extension from root portion plane P may vary depending upon the application, and the maximum extension will be determined by the size of the chain and the lateral distance between smaller diameter sprocket 10 and larger diameter sprocket 14 so as to prevent corner 88a from touching chain 18 when chain 18 is engaged with smaller diameter sprocket 10. In known sprocket configurations, corner 88a could extend up to approximately 0.4 mm from root portion plane P.

Because projecting portion 54c extends laterally outwardly from root portion plane P, a corner 88b formed between top edges 84a and 84d may be recessed further than known shift assist tooth designs to further assist the shifting of chain 18 from smaller diameter sprocket 10 to larger diameter sprocket 14 without sacrificing the strength of shift assist tooth 54a. In this embodiment, corner 88b is recessed approximately 1.3 mm from second side surface 70. Of course, corner 88b could be recessed even further in other embodiments, such as those embodiments where corner 88a projects further from root portion plane P.

Similarly, because projecting portion 54c extends laterally outwardly from root portion plane P, a corner 88c formed between top edges 84a and 84c may be recessed further than known shift assist tooth designs to further assist the shifting of chain 18 from smaller diameter sprocket 10 to larger diameter sprocket 14 without sacrificing the strength of shift assist tooth 54a. In this embodiment, corner 88c is recessed approximately 1.0 mm from second side surface 70. Of course, corner 88c could be recessed even further in other embodiments, such as those embodiments where corner 88a projects further from root portion plane P.

While the above is a description of various embodiments of inventive features, further modifications may be employed without departing from the spirit and scope of the present invention. For example, shift assist recess 74 may be formed of a cutout instead of a recess. The number of teeth spanned by shift assist recess 74 can be increased or reduced depending upon the application, and it is preferable in some applications to span only one tooth, such as tooth 54b. The size, shape, location or orientation of the various components may be changed as desired. Some such variations are disclosed in U.S. Pat. No. 4,889,521. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:
1. A bicycle rear wheel sprocket comprising:
a sprocket body having a first side surface and a second side surface;
a plurality of sprocket teeth extending radially outwardly from a root portion of the sprocket body;
wherein a root portion side surface of the root portion defines a root portion plane at the first side surface of the sprocket body;
a shift assist recess formed in the root portion below a first sprocket tooth at the first side surface of the sprocket body;
wherein a second sprocket tooth has a projecting portion that extends laterally outwardly from the root portion plane at the first side surface of the sprocket body;

wherein the projecting portion is formed by a top edge of the second sprocket tooth;

wherein a first uppermost top edge of the second sprocket tooth at the first side surface of the sprocket body is inclined relative to the root portion plane when viewed from the top of the second sprocket tooth; and wherein the projecting portion forms an abutment for abutting against a forward edge of an outer link plate of a chain that faces in a rotational direction of the sprocket.

2. The sprocket according to claim 1 wherein the second sprocket tooth includes an opposite top edge opposite the top edge, and wherein the opposite top edge is inclined relative to the root portion plane.

3. The sprocket according to claim 2 wherein the top edge is substantially parallel to the opposite top edge.

4. The sprocket according to claim 1 wherein the root portion plane is disposed at a laterally outermost face of the first side surface of the sprocket body.

5. The sprocket according to claim 1 wherein the projecting portion extends laterally outwardly less than 0.4 mm. from the root portion plane.

6. The sprocket according to claim 5 wherein the projecting portion extends laterally outwardly approximately 0.2 mm. from the root portion plane.

7. The sprocket according to claim 1 wherein a top edge of the second tooth opposite a top edge of the projecting portion is positioned greater than 1.3 mm laterally from the second side surface of the sprocket body.

8. The sprocket according to claim 7 wherein a corner formed at least in part by the top edge of the second tooth is positioned greater than 1.3 mm laterally from the second side surface of the sprocket body.

9. The sprocket according to claim 8 wherein the corner faces the first side surface of the sprocket body.

10. The sprocket according to claim 1 wherein a top edge of the second tooth that is in front of a top edge of the projecting portion in a rotation direction of the second tooth is positioned greater than 1.0 mm laterally from the second side surface of the sprocket body.

11. The sprocket according to claim 10 wherein a corner formed at least in part by the top edge of the second tooth is positioned greater than 1.0 mm laterally from the second side surface of the sprocket body.

12. The sprocket according to claim 11 wherein the corner faces the first side surface of the sprocket body.

13. The sprocket according to claim 1 wherein the abutment is configured to impede movement of the chain in the rotational direction to promote proper pitch alignment with a third tooth upstream of the second tooth in the rotational direction.

14. The sprocket according to claim 1 wherein the second tooth is immediately adjacent to the first tooth.

15. The sprocket according to claim 1 wherein the shift assist recess is positioned so that an outer link plate of the chain is disposed in the recess when the projecting portion abuts against the forward edge of the outer link plate of the chain.

16. A bicycle rear wheel sprocket comprising:
a smaller diameter first sprocket including a first sprocket body;
a plurality of sprocket teeth extending radially outwardly from the first sprocket body;
a larger diameter second sprocket including a second sprocket body having a first side surface and a second side surface, wherein the first side surface faces in a direction toward the first sprocket;
a plurality of sprocket teeth extending radially outwardly from a root portion of the second sprocket body;
wherein the second sprocket has a greater number of teeth than the first sprocket;
wherein a root portion side surface of the root portion defines a root portion plane at the first side surface of the second sprocket body;
a shift assist recess formed in the root portion below a first sprocket tooth at the first side surface of the second sprocket body;
wherein a second sprocket tooth has a projecting portion that extends laterally outwardly from the root portion plane at the first side surface of the second sprocket body;
wherein the projecting portion is formed by a top edge of the second sprocket tooth;
wherein a first uppermost top edge of the second sprocket tooth at the first side surface of the sprocket body is inclined relative to the root portion plane when viewed from the top of the second sprocket tooth; and
wherein the sprocket teeth of the first sprocket and the second sprocket are spaced apart such that, when a chain shifts from the first sprocket to the second sprocket, the projecting portion abuts against a forward edge of an outer link plate of the chain that faces in a rotational direction of the second sprocket when the outer link approaches the second sprocket tooth.

* * * * *